United States Patent
Czuszak

[11] 3,767,319
[45] Oct. 23, 1973

[54] HIGH EXHAUST PRESSURE TRIP MECHANISM FOR TURBINES

[75] Inventor: Charles C. Czuszak, Greensburgh, Pa.

[73] Assignee: Carrier Corporation, Syracuse, N.Y.

[22] Filed: Apr. 3, 1972

[21] Appl. No.: 240,719

[52] U.S. Cl. .................................... 415/17, 415/20
[51] Int. Cl. ............................................ F01b 25/00
[58] Field of Search ..................... 415/17, 20; 60/1

[56] References Cited
UNITED STATES PATENTS

| | | | |
|---|---|---|---|
| 2,523,039 | 9/1950 | Mayor et al. | 415/17 |
| 2,232,852 | 2/1941 | Hemenway | 60/1 |
| 2,247,086 | 6/1941 | Grube | 60/1 |

Primary Examiner—C. J. Husar
Attorney—J. Raymond Curtin

[57] ABSTRACT

The invention relates to a high exhaust pressure trip mechanism for operating the steam inlet trip valve of a steam turbine. The exhaust area of the turbine is equipped with a relief valve, the outlet of which is connected to a cylinder. When the exhaust reaches a predetermined pressure, a piston in the cylinder is moved inwardly to move a latch out of latching position with the trip valve mechanism. When the piston has completed its inward stroke, the steam pressure in the cylinder is exhausted to a discharge passage to prevent excessive pressure build-up at the outer end of the piston.

6 Claims, 4 Drawing Figures

HIGH EXHAUST PRESSURE TRIP MECHANISM FOR TURBINES

BACKGROUND OF THE INVENTION

Often the exhaust steam from a steam turbine is used in manufacturing processes. The turbine, in addition to serving as a prime mover, also serves to effect a pressure drop to provide exhaust steam at a pressure satisfactory for use in the process.

If the flow of steam from the exhaust area of the turbine is interrupted, a back pressure can quickly develop and be of such magnitude as to seriously damage the turbine. As the exhaust back pressure builds up, the turbine slows down, causing the governor valve to open wider and admit more steam to the turbine, whereby the pressure of the exhaust steam builds up causing a serious and dangerous situation. To avoid an excessive build-up in the exhaust area of the turbine, relief valves are employed on occasion; however, out of necessity they have to be large and expensive valves and some means has to be provided for dispensing the large volume of exhaust steam.

This invention has as an object a trip mechanism operated by a high exhaust pressure for quickly tripping the emergency trip valve on the turbine, thereby stopping the flow of steam into the turbine.

SUMMARY OF THE INVENTION

The turbine is of the conventional type equipped with an emergency trip valve operable, when tripped, to stop the flow of steam to the turbine. The exhaust area of the turbine is provided with a relief valve, the outlet of which is connected to the outer end of a latch releasing cylinder. A stem is connected to the inner end of the piston in the cylinder, and upon inward movement of the piston and stem, the stem is operable to trip a latch to permit closing operation of the trip valve. When the pressure in the exhaust area of the turbine reaches a predetermined level, the relief valve passes steam to the cylinder for actuation of the piston and the stem. In the embodiment shown in the drawings, the piston is formed with passages extending from the outer end of the piston inwardly, and terminating short of the inner end of the piston. These passages serve to discharge steam from the outer end of the cylinder to a steam exit pipe when the latch is tripped.

DESCRIPTION OF THE PREFERRED EMBODIMENT

Figure 1:
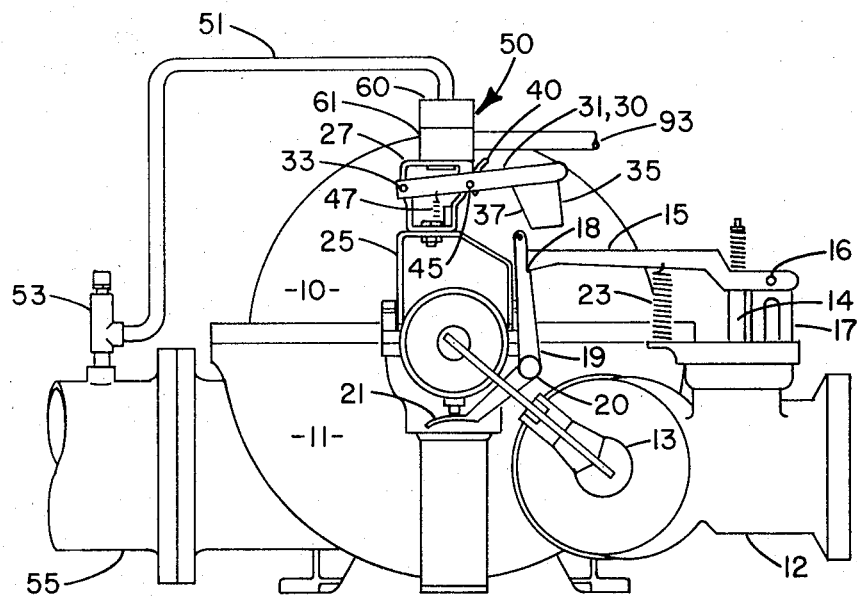
FIG. 1 is a representation in elevation of the steam end of a turbine equipped with my invention.
Figure 3:
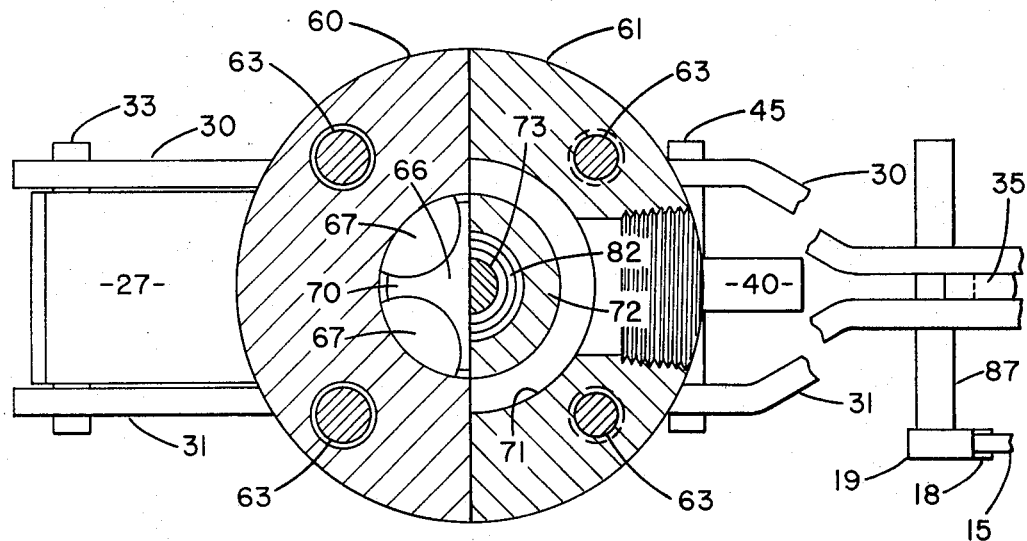
FIG. 3 is a view further enlarged taken on line 3—3, FIG. 2.

Referring to FIG. 1, the upper and lower sections of the turbine are indicated at 10, 11. Steam pressure is applied to the trip valve 12 for supplying operating steam to the turbine, usually through a governor valve 13. The trip valve includes a stem 14 having a connection with an arm 15, one end of which is pivotally connected, as at 16, to a standard 17. The opposite end of the arm 15 is positioned in a notch 18 formed in a restraining lever 19 pivotally mounted at 20. The restraining lever 19 has an extension 21, the terminus of which may be engaged by an over speed trip mechanism connected to the turbine shaft.

When the restraining member 19 is moved in a counterclockwise direction about the pivot 20, it is moved out of engagement with the arm 15, which is urged downwardly by tension spring 23 to effect downward movement of the valve stem 14 to close the trip valve 12, see FIG. 1.

A bracket 25 is fixed to the turbine housing and supports a frame 27. A cam lever, consisting of a pair of bars 30, 31 is pivotally mounted on a pivot pin 33 in the frame 27. The free end of the cam lever structure is provided with a cam plate 35 having an inclined cam edge 37.

Figure 2:
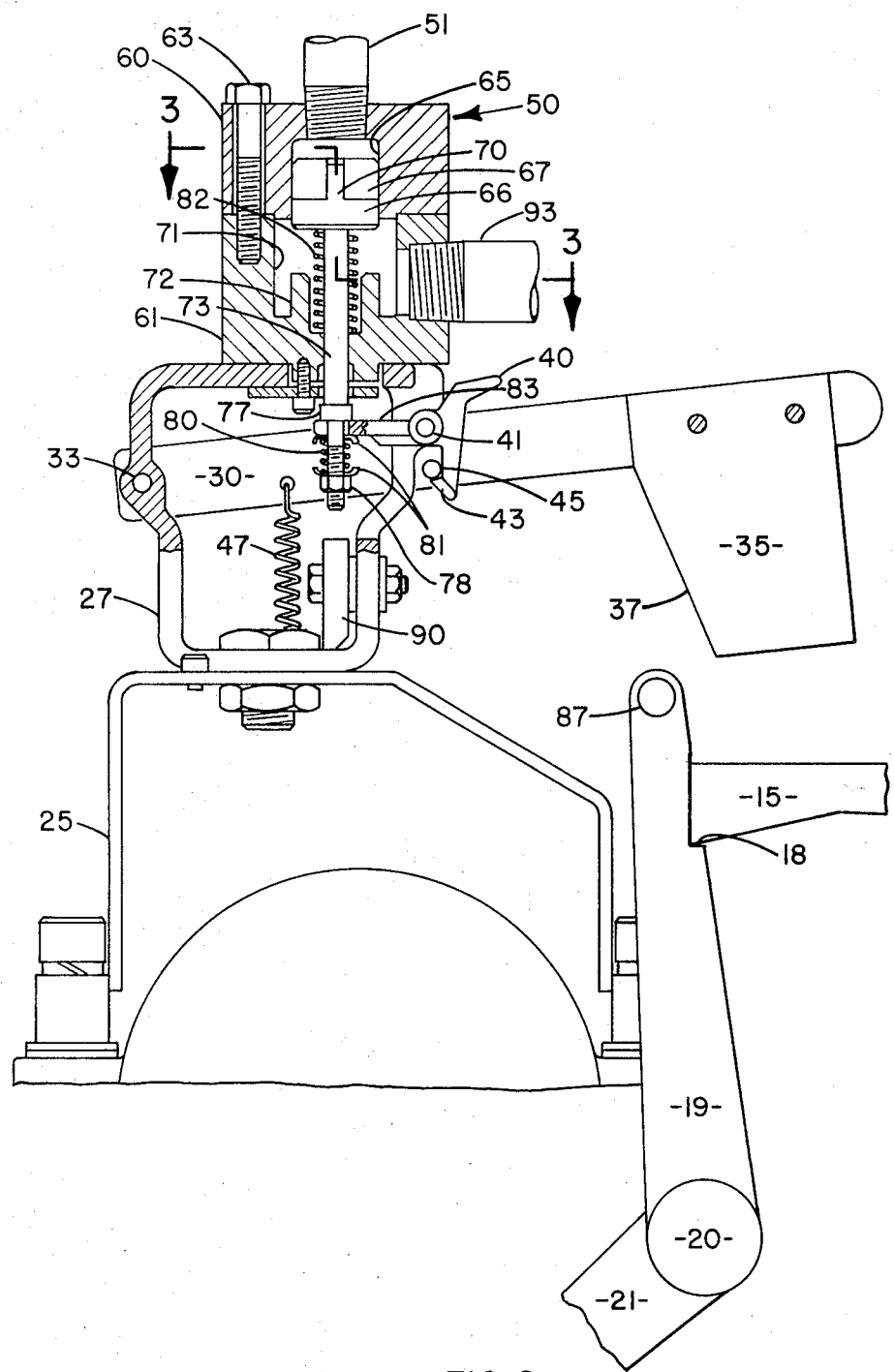
FIG. 2 is an enlarged vertical sectional view of the latch actuating mechanism.

The cam lever structure is maintained in the position shown in FIGS. 1 and 2 by a latch 40 pivotally mounted at 41 to the frame 27. The latch has a hook portion 43 engaging under a pin 45 in the cam levers 30, 31. The cam lever structure is urged downwardly by tension springs 47. A cylinder structure 50 is mounted on the frame 27. A steam line 51 connects the outer end of the cylinder structure with an adjustable relief valve 53 connected to the turbine exhaust pipe 55, see FIG. 1.

Figure 4:
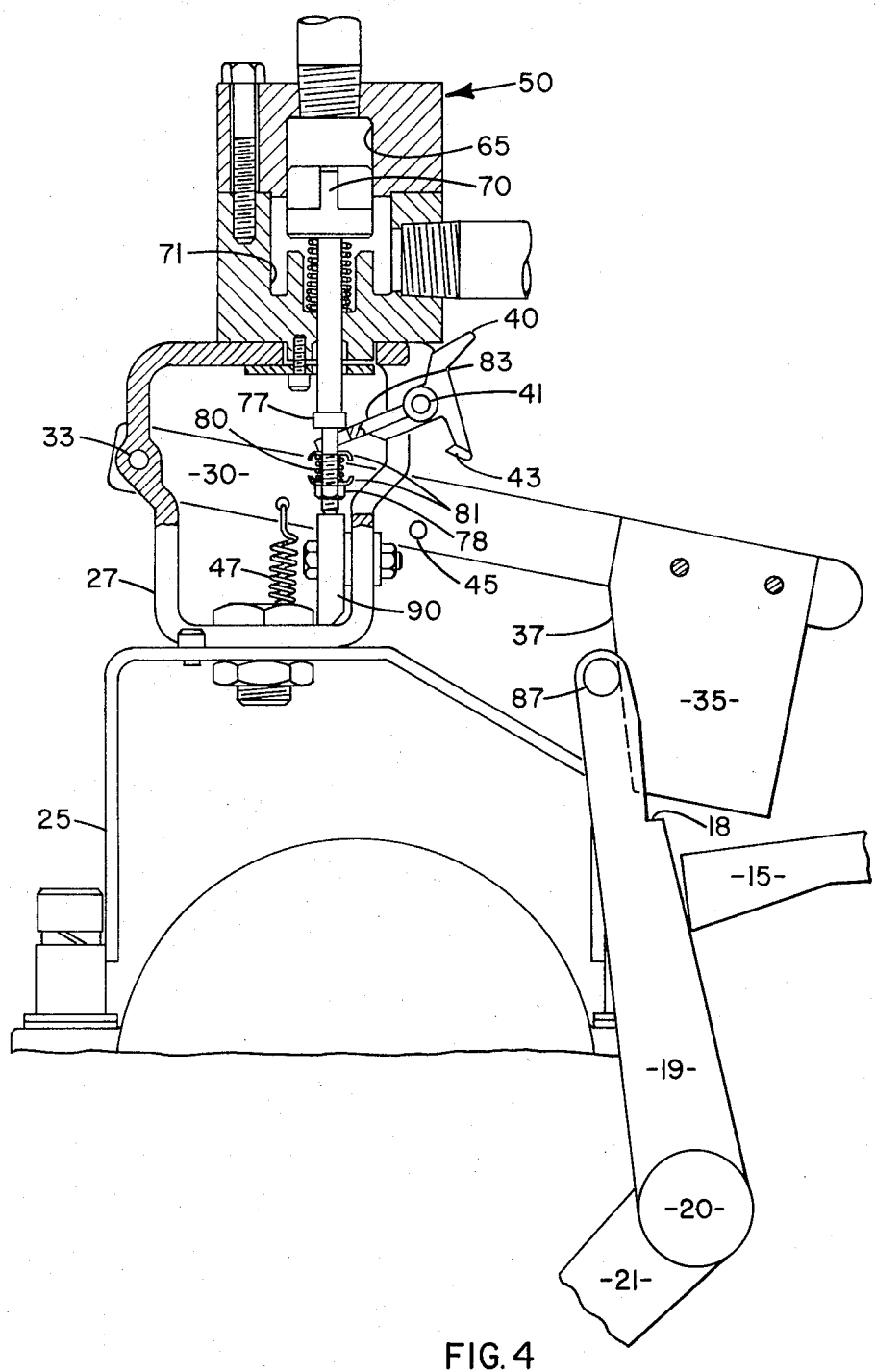
FIG. 4 is a view similar to FIG. 2 showing the piston and stem in the inward down position, and the latch moved out of latching position.

The cylinder structure, as shown in FIGS. 2 and 4, consists of upper and lower sections 60, 61 secured together by cap screws 63. The upper section 60 is formed with a cylinder bore 65 in which a piston 66 is positioned for reciprocation in the cylinder bore. The piston 66 is formed with passages 67 extending inwardly from the outer end of the piston and terminating in spaced relation to the inner end thereof. The passages 67 are shown as flutes separated by lands 70.

The lower section 61 is formed with an enlarged bore 71. A cylindrical flange 72 is formed in the inner portion of the bore 71, the flange being spaced concentrically from the bore 71 and from a stem 73 fixed at its upper end to the piston 66.

The stem 73 extends downwardly through the section 61 and is formed at its lower end with a collar 77 and is provided with a nut 78. A helical compression spring 80 and washers 81 are positioned on the inner end of the stem between the nut 78 and the collar 77. A helical compression spring 82 encircles the stem 73 acting against the piston 66 and the bottom of the bore within the flange 72, see FIGS. 2 and 4. The spring 82 functions to yieldingly urge the piston 66 upwardly maintaining the latch 40 in latching position.

The latch 40 is formed with a tail piece 83, the end portion of which is slotted to receive the stem 73 and is positioned between the collar 77 and the upper washer 81.

Upon the opening of the relief valve 53 at a predetermined pressure in the exhaust pipe 55, steam is admitted through the line 51 against the piston 66, effecting inward movement of the piston and the stem 73. As will be readily apparent, downward movement of the stem 73 effects counterclockwise movement of the latch 40, about the pivot pin 41, moving the hook portion 43 from underneath the pin 45. Thereupon, the springs 47 move the cam arms 30, 31 downwardly, effecting engagement of the inclined cam surface 37 of cam 35 with pin 87 projecting laterally from restraining member 19. Such engagement effects counterclockwise movement of member 19 about the pivot 20 to move the notch 18 out of engagement with the free end of the member 15, which is moved downwardly by spring 23 to close the trip valve 12.

Such inward movement of the piston and stem 73 is limited by a stop member 90, as shown in FIG. 4. With the piston and the stem moved inwardly to the latch tripping position, the lower portions of the flute passages 67 are moved below the inner end of the cylinder bore 65 permitting steam to escape into the larger bore area 71, which has communication with an exit pipe 93. This arrangement prevents the build-up of excessive steam pressure against the piston 66. Other structural arrangements may be employed to relieve pressure in the cylinder bore 65 when the latch 40 has been tripped. However, the piston and cylinder structure shown is economical to construct and the lands 70 provide guiding means for the piston while it is in the inward position. The enlarged bore provides ample passage means for the escape of the steam.

While a preferred embodiment of this invention has been described for purposes of illustration, it will be appreciated that this invention may be otherwise embodied within the scope of the following claims.

I claim:

1. A high exhaust pressure trip mechanism for effecting operation of the trip valve in the steam supply line to a steam turbine to closed position, a latch member movable into and out of latching position, said latch being cooperable, in latching position, to restrain operation of the trip valve closing means, said trip mechanism comprising a cylinder structure formed with a cylinder bore, a piston mounted for reciprocation between inward and outward positions in said bore, a stem extending from the inner end of said piston and being operatively connected to said latch, spring means exerting an outward yielding pressure on said piston to maintain said latch in latching position, pressure responsive means operable, upon the exhaust steam in the exhaust area of the turbine reaching a pressure in excess of the pressure exerted by said spring means, to apply the exhaust steam against the outward end of said piston to effect inward movement thereof for movement of said latch out of latching position, and passage means for discharging steam from said cylinder bore upon movement of said latch from latching position.

2. A high exhaust pressure trip mechanism according to claim 1 wherein said passage means is formed in part in said cylinder structure.

3. A high exhaust pressure trip mechanism according to claim 1 wherein said passage means is formed in part in said piston.

4. A high exhaust pressure trip mechanism according to claim 1 wherein said cylinder structure is formed with an enlarged bore inwardly of said cylinder bore and communicating therewith, said piston is formed with a passage extending axially from the outer end of the piston and communicating with said enlarged bore upon inward movement of said piston in said cylinder bore.

5. A high exhaust pressure trip mechanism according to claim 1 wherein said passage means includes flutes formed in the peripheral surface of the piston, said flutes extending inwardly from the outer end of the piston and terminating in spaced relation to the inner end thereof.

6. A high exhaust pressure trip mechanism according to claim 1 wherein said cylinder structure is formed with a steam discharge port disposed inwardly of said cylinder bore and said piston is formed with a passage connecting said discharge port to the area of said cylinder bore, upon movement of said latch out of latching position.

* * * * *